3,029,139
INHIBITION OF CORROSIVE ACTION OF AQUE-
OUS AMMONIUM NITRATE-UREA ON FERROUS
METALS
Joseph B. Arots, Wilmington, Del., and Kenneth J.
Fletcher, Hopewell, Va., assignors to Hercules Powder
Company, Wilmington, Del., a corporation of Dela-
ware
No Drawing. Filed Dec. 30, 1958, Ser. No. 783,677
13 Claims. (Cl. 71—30)

This invention relates to aqueous ammonium nitrate-urea solutions containing selected chromate ion yielding compounds which function to inhibit corrosive action of the solution on ferrous metals. In one aspect this invention relates to a method for handling aqueous ammonium nitrate-urea solutions in contact with ferrous metals substantially under noncorrosive conditions by maintaining selected chromate ion yielding compounds in the solution during the said contact. In still another aspect this invention relates to the use of alkali metal chromates and dichromates, particularly sodium chromate, as inhibitors of corrosive action of aqueous ammonium nitrate-urea solutions on mild steel, especially when the latter forms a container in which the solution is stored.

Aqueous ammonium nitrate-urea solutions have had wide use for some time as soil fertilizers merely by application to the soil. These solutions can be of any desired concentration varying from a high state of dilution to saturation. Solid ammonium nitrate and urea may be contained in the solution in some instances. However, generally a minimum of at least 5 percent of each nitrogen-containing component is utilized, aqueous fertilizer solutions containing from about 5 to about 60 weight percent ammonium nitrate and from about 5 to about 50 weight percent urea being most often employed. In some instances small amounts of free ammonia, say up to about 2 weight percent, may inherently be present as result of the manufacture of the ammonium nitrate via the ammonia oxidation route.

These solutions exert a marked corrosive effect on ferrous metals which precludes storage and shipping of same in ferrous containers and handling in ferrous lines, valves, and the like, without damage to the ferrous metal and, consequently, an unduly short service period for the ferrous metal concerned.

This invention is concerned with aqueous ammonium nitrate-urea solutions, particularly fertilizer solutions, which contain agents for substantially completely eliminating, or markedly reducing, their corrosive action on ferrous metals.

An object of the invention is to provide a method for inhibiting corrosion of ferrous metals by aqueous urea-ammonium nitrate solutions. Another object is to provide aqueous solutions of urea and ammonium nitrate which are substantially noncorrosive to ferrous metals. Another object is to provide for use of selected chromate ion yielding compounds, soluble in aqueous ammonium nitrate-urea solutions, for preventing or substantially reducing corrosive action of the said solution on ferrous metals. Another object is to provide for handling of aqueous ammonium nitrate-urea solutions in lines and valves, and/or storing same in containers fabricated from mild steel, with substantially no corrosive effect of the solution on the said mild steel. Other aspects and objects will be apparent from the accompanying disclosure and the appended claims.

In accordance with the invention an aqueous solution of ammonium nitrate and urea is provided which contains as an inhbitor of corrosive action of the said solution on ferrous metals, at least one chromate ion yielding compound of a cation selected from the group consisting of ammonium and metals of groups I, II, IV, VI and VIII of the periodic table which is capable of yielding chromate ion to said solution in a concentration of at least 250 p.p.m., and said solution containing sufficient amount of chromate ion yielding compound to yield said chromate ion in said concentration.

Further, in accordance with the invention, a method is provided for reducing corrosive action of an aqueous ammonium nitrate-urea solution on ferrous metals, which comprises maintaining in said solution, when in contact with a ferrous metal, at least one chromate ion yielding compound of a cation selected from the group consisting of ammonium and metals of groups I, II, IV, VI and VIII of the periodic table which is capable of yielding chromate ion to said solution in a concentration of at least 250 p.p.m., and maintaining a sufficient amount of chromate ion yielding compound in said solution to yield said chromate ion in said concentration.

Further illustrative of the chromate ion yielding compounds of the invention are ammonium chromate, ammonium dichromate, calcium chromate, copper chromate, copper dichromate, iron dichromate, lithium chromate, lithium dichromate, magnesium chromate, potassium chromate, potassium dichromate, sodium chromate, sodium dichromate, stannic chromate and zinc dichromate. The chromate ion yielding compounds can be hydrated or anhydrous.

The invention is illustrated with reference to the following examples.

*Example 1*

A 1⅛ x ½ x 0.010 inch strip of mild steel was immersed in a solution (weight basis) of about 35 percent urea, 45 percent ammonium nitrate and 20 percent water, containing 0.2 percent free ammonia, at 40° C. for 192 hours. The steel test strip was AISI 1010 [1] mild steel and was prepared for testing by abrasion with pumice and activation by immersion in 5 percent sulfuric acid for 3 seconds. Corrosion was found to take place at a rate of 125 mils per year. An amount of 500 parts per million of chromate, as $Na_2CrO_4.4H_2O$, was added to the solution under the same temperature conditions and the corrosion rate measured after 216 hours. The

$Na_2CrO_4.4H_2O$ addition was found to reduce the corrosion rate to less than 0.01 mil per year.

*Example 2*

A 1½ x ½ x 0.010 inch test strip of mild steel of Example 1 was immersed in a solution (weight basis) of about 35 percent urea, 45 percent ammonium nitrate, and 20 percent water, containing 0.45 percent free ammonia, at 40° C. for 120 hours. Corrosion was found to take place at a rate of 210 mils per year. An amount of 500 parts per million of chromate, as $Na_2CrO_4.4H_2O$, was added to the solution under the same temperature conditions and the corrosion rate measured after 48 hours. The $Na_2CrO_4.4H_2O$ addition was found to reduce the corrosion rate to less than 0.01 mil per year.

*Example 3*

The test of Example 2 above was repeated except that 0.1 weight percent magnesium dichromate was added to the solution in lieu of the sodium chromate. The reduced corrosion rate was less than 0.01 mil per year.

*Example 4*

The test of Example 2 was repeated except that 0.1 weight percent ammonium dichromate was the inhibitor compound tested in lieu of sodium chromate. The reduced corrosion rate was less than 0.01 mil per year.

---

[1] American Iron and Steel Institute.

Example 5

A 1⅛ x ½ x 0.010 inch mild steel test strip was immersed in a solution (weight basis) of about 35 percent urea, 45 percent ammonium nitrate, and 20 percent water with a sufficient amount of sodium hydroxide added to raise the pH to 8 plus 500 parts per million of chromate, as $Na_2CrO_4 \cdot 4H_2O$, added as an inhibitor at 40° C. for 24 hours. The reduced corrosion rate was less than 0.01 mil per year.

Example 6

Test strips, 1⅛ x ½ x 0.010 inch, of mild steel similar to that of Example 1 were immersed in solutions (weight basis) of about 35 percent urea, 45 percent ammonium nitrate and 20 percent water, containing free ammonia amounts from none to 0.8 percent, at 40° C. for 48 to 216 hours. The rate of corrosion of each strip was measured. The tests were carried out in the presence of sodium chromate, $Na_2CrO_4 \cdot 4H_2O$, and the rate of corrosion of each strip measured. The following tabulation summarizes the results.

| Percent Free $NH_3$ | pH | Chromate Concentration | Rate of Corrosion mils/year |
|---|---|---|---|
| None | 6.0 | None | 172 |
| 0.3 | 8.5 | None | 239 |
| 0.8 | 9.0 | None | 525 |
| None | 6.7 | 500 p.p.m. | 0.03 |
| 0.3 | 8.35 | 250 p.p.m. | 0.09 |
| 0.8 | 9.0 | 500 p.p.m. | <0.01 |

Example 7

Several test strips of mild steel of Example 1 were immersed for 5.6 days at 40° C. in a solution of 55 weight percent ammonium nitrate, 45 percent water and sufficient ammonia to maintain a solution pH of 8. At the end of that time the rate of corrosion of the strips, by the solution, was measured and was found to be from 5.5–5.8 mils per year. The test was repeated except that the solution consisted of 40 percent urea, 60 percent water and the exposure was 7 days, and sufficient ammonia was present to maintain the solution pH at 8.4. At the end of that time the rate of corrosion of the strips, by the solution, was measured and found to be from 1–4 mils per year. The procedure was repeated except that the solution contained both urea and ammonium nitrate, namely, 45 percent ammonium nitrate, 30 percent urea and 25 percent water with sufficient ammonia present to maintain the solution pH at 8.5. The exposure time was 4.7 days. The rate of corrosion of the strip was then measured and found to be 239 mils per year.

All percentages reported in the foregoing examples are on a weight basis.

The foregoing example demonstrates the high corrosion rate of ammonium nitrate-urea solutions entirely unexpected from the observed corrosion rates of separate aqueous solutions of the individual components.

The amount of chromate ion yielding compound utilized in the practice of the invention can be varied over a wide range, the minimum being that which yields chromate ions to the solution in the concentration of at least 250 p.p.m. The minimum content of ion yielding compound is dependent upon the specific compound and upon solution conditions, particularly pH. Thus, at a pH in the order of 7, the minimum content, on an anhydrous weight basis, is generally within the range of from about 0.02 to about 0.08 percent. However, at a lower pH value the minimum required content of chromate ion yielding compound is higher. Thus, at a pH of 5.7 a minimum content of chromate ion yielding compound of from about 0.15 to 0.6 will generally be required.

The upper content limit of chromate ion yielding compound is to a large degree a matter of practicability, but in any event need not exceed that which is capable of supplying chromate ions to the solution in a concentration of 5000 p.p.m. Thus, at pH values in the range of 7–9 a concentration of chromate ion yielding compound for providing maximum ion concentration, i.e., up to about 5000 p.p.m., will vary from the above described minimum up to about 1.5 weight percent. At a pH below 7, say in the range of about 5 but below 7, the content required for maximum chromate ion concentration will vary in the different instances up to about 12 percent.

Of course, the chromate ion yielding compounds employed in the practice of this invention do not yield the same chromate ion concentration under the same conditions. Thus, sodium chromate in a concentration of 0.7 percent (anhydrous basis) will yield a chromate ion concentration of 5000 p.p.m. at a pH of 7, whereas about 1.5 percent of basic copper chromate is required for the same yield at that pH. Further, as will be appreciated, not all chromate ion yielding compounds employed in the practice of the invention are capable of yielding a chromate ion concentration as high as 5000 p.p.m. although, of course, they yield at least the above described minimum chromate ion concentration.

It is generally within the range of 0.02 to 12 weight percent (anhydrous basis) of chromate ion yielding compound that is utilized in the practice of the invention. However, aqueous ammonium nitrate-urea solutions generally contain small amounts of free amonia, up to about 2 weight percent, but more often from about 0.2 up to about 1 weight percent, which is inherently present in the ammonium nitrate component from its manufacture. The pH of the solution to which this invention is often applied is therefore in the range of about 7 to 9, which solution contains, accordingly, a concentration of chromate ion yielding compound in the order of about 0.02 up to 1.5 weight percent.

Although in practice of the invention we generally employ only one chromate ion yielding compound in the solution, a plurality of those compounds can be utilized as a mixture in the same solution if desired.

In the practice of a preferred embodiment, an amount of an alkali metal chromate, e.g., $Na_2CrO_4 \cdot 4H_2O$, sufficient to supply from about 250 (0.035 wt. percent, anhyd.) to 2000 (0.28 wt. percent, anhyd.) p.p.m. of chromate ion, is added to an aqueous ammonium nitrate-urea fertilizer solution containing, on a weight basis, from about 5 to 60 percent ammonium nitrate, 5 to 50 percent urea, and 15 to 25 percent water, and free ammonia up to about 1 weight percent, generally present in a concentration of at least 0.3 percent, to provide a minimum concentration of chromate ion of from 250 to 500 parts per million, and preferably about 500 to 2000 parts per million. When desired, a concentration of 5000 parts per million (about 0.7 percent sodium chromate) and higher can be utilized, although at concentrations above 5000 parts per million, solubility of the salt becomes more difficult.

The invention is advantageously applied to the storage and shipping of aqueous ammonium nitrate-urea fertilizer solutions in steel tanks at atmospheric temperatures, which can, of course, be as high as 40° C. or higher. As will be appreciated, particularly in light of a review of the examples herein which illustrate steel alloys from which storage tanks and containers for aqueous ammonium nitrate-urea solution are fabricated, without inhibiting action provided in accordance with the invention, the service period of the steel container will be unduly short.

It is preferred that the steel container be free from film of any kind on its inner wall surfaces at the time that the solution, with inhibitor, is charged to it. If corrosion by an aqueous ammonium nitrate-urea solution has been in progress for some time, agitation of the newly added chromate-containing solution in the vessel will generally initiate the desired inhibiting effect. In those instances wherein corrosion of the container inner wall has previously taken place to the extent that inhibiting effect of the newly added solution is not initiated by agitation alone, a single water washing of the vessel inner wall prior to introduction of the inhibitor-containing solution of this invention will provide for immediate inhibiting effect upon introduction of the solution into the vessel.

Although the invention is applied to ammonium nitrate, urea and water mixtures in any relative solution concentrations, with or without free ammonia as described herein, those solutions generally contain, on a weight basis, at least 15 percent water, about 5–60 percent ammonium nitrate and about 5–50 percent urea.

As will be evident to those skilled in the art, various modifications can be made or followed, in the light of the foregoing disclosure and discussion, without departing from the spirit or scope of the disclosure or from the scope of the claims.

What we claim and desire to protect by Letters Patent is:

1. As a new composition, an aqueous solution of ammonium nitrate and urea containing dissolved therein up to 2 weight percent free ammonia and, as an inhibitor of corrosive action of the said solution or ferrous metals, at least one water soluble compound selected from the group consisting of chromates and dichromates of cations selected from the group consisting of ammonium, and metals of the groups I, II, IV, VI and VIII of the periodic table, and the said inhibitor being present in said solution in an amount yielding chromate ions to said solution in a concentration of at least 250 parts per million.

2. A composition of claim 1 wherein said aqueous solution contains from 0.02 to 1.5 weight percent (anhydrous basis) of said water-soluble inhibitor compound.

3. A composition of claim 1 wherein said inhibitor compound is an alkali metal chromate, said solution containing, on a weight basis, from 5 to 60 percent ammonium nitrate, from 5 to 50 percent urea, not more than 1 percent free ammonia, and chromate ion in a concentration not exceeding about 5,000 parts per million.

4. A composition of claim 3 wherein said alkali metal is sodium chromate and said chromate ion concentration does not exceed about 2,000 parts per million.

5. A composition of claim 1 wherein said inhibitor is sodium chromate.

6. A composition of claim 1 wherein said inhibitor is ammonium dichromate.

7. A composition of claim 1 wherein said inhibitor is magnesium dichromate.

8. A composition of claim 1 wherein said solution contains from 0.02 to 12 weight percent (anhydrous basis) of said water soluble inhibitor compound.

9. A composition of claim 1 containing from 5 to 60 weight percent ammonium nitrate, from 5 to 50 weight percent urea, free ammonia in an amount sufficient to maintain the solution pH within the range of 7 to 9, a sufficient amount of said inhibitor to yield chromate ions in a concentration up to 2000 parts per million, and the remainder water.

10. A method for inhibiting corrosive action on ferrous metals of an aqueous solution of ammonium nitrate and urea containing up to 2 weight percent free ammonia, which comprises maintaining dissolved in said solution, when in contact with such metal, at least one water soluble compound selected from the group consisting of chromates and dichromates of cations selected from the group consisting of ammonium, and metals of the groups I, II, IV, VI and VIII of the periodic table, and the said inhibitor being present in said solution in an amount yielding chromate ions to said solution in a concentration of at least 250 parts per million to thereby inhibit said corrosive action.

11. In the method of claim 10, storing said ammonium nitrate-urea solution in a steel container in direct contact with the inner wall thereof, and maintaining from 0.02 to 12 weight percent (anhydrous basis) of said water soluble inhibitor compound in said solution.

12. A method of claim 11, wherein said solution contains from 5 to 60 weight percent ammonium nitrate, from 5 to 50 weight percent urea, and from about 0.3 to 1 weight percent free ammonia, and maintaining said water soluble inhibitor compound in said solution in an amount of from 0.02 to 1.5 weight percent (anhydrous basis).

13. In a method of claim 12, maintaining sodium chromate in said solution as said water soluble inhibitor compound in an amount sufficient to yield from 250 to 2000 parts per million of chromate ion.

References Cited in the file of this patent

UNITED STATES PATENTS

| | | |
|---|---|---|
| 2,135,160 | Beekhuis | Nov. 1, 1938 |
| 2,238,651 | Keenen | Apr. 15, 1941 |
| 2,549,430 | Crittenden | Apr. 17, 1951 |
| 2,855,286 | Harvey | Oct. 7, 1958 |